United States Patent
Jose

(10) Patent No.: US 11,497,284 B2
(45) Date of Patent: Nov. 15, 2022

(54) ROSARY HAVING ILLUMINATED OBJECTS AND A CLOCK FOR IDENTIFYING PRAYERS OF THE DAY

(71) Applicant: Joseph Jose, Chantilly, VA (US)

(72) Inventor: Joseph Jose, Chantilly, VA (US)

( * ) Notice: Subject to any disclaimer, the term of this patent is extended or adjusted under 35 U.S.C. 154(b) by 0 days.

(21) Appl. No.: 17/487,427

(22) Filed: Sep. 28, 2021

(65) Prior Publication Data

US 2022/0211148 A1     Jul. 7, 2022

Related U.S. Application Data

(60) Provisional application No. 63/133,289, filed on Jan. 1, 2021.

(51) Int. Cl.
| | |
|---|---|
| *A44C 23/00* | (2006.01) |
| *G09G 3/00* | (2006.01) |
| *A44C 15/00* | (2006.01) |

(52) U.S. Cl.
CPC .......... *A44C 23/00* (2013.01); *A44C 15/0015* (2013.01); *G09G 3/035* (2020.08)

(58) Field of Classification Search
CPC .... A44C 23/00; A44C 15/0015; G09G 3/035; G09B 19/00; G06M 1/00
See application file for complete search history.

(56) References Cited

U.S. PATENT DOCUMENTS

| | | |
|---|---|---|
| 4,601,584 A | 7/1986 | DeWolf et al. |
| 5,505,622 A | 4/1996 | Bosmani |
| 6,540,519 B2 | 4/2003 | Wexler |
| 7,204,694 B2 | 4/2007 | Delvecchio et al. |
| | (Continued) | |

OTHER PUBLICATIONS

Electronic Rosary Digital Talking Rosary, downloaded from webpage: <https://www.amazon.com/Electronic-Rosary-Digital-Talking-Rosary/dp/B0046LV490>, download date: Sep. 24, 2021, Date First Available as stated on web page: Sep. 16, 2010, 8 pages.

*Primary Examiner* — Richard J Hong
(74) *Attorney, Agent, or Firm* — Panitch Schwarze Belisario & Nadel LLP

(57) ABSTRACT

An apparatus for praying the rosary includes a flexible elongate member and a plurality of beads and transition objects carried thereby, a display fixedly attached to each of the transition objects, and a unitary structure that is connected to each end of the conductive wire bundle. The plurality of beads includes sets of beads separated by respective transition objects, wherein one portion of the flexible elongate member is a conductive wire bundle having a plurality of wires for providing power and ground for use by the transition objects. Each display includes a plurality of sections which are individually illuminated by a respective light source to reveal or visually highlight an image in the respective section. The plurality of wires is electrically connected to the display to provide power and ground to the respective light sources. The unitary structure houses a clock, a logic circuit, and a power source for the clock and logic circuit. The logic circuit is electrically connected to the conductive wire bundle so as to output power to one of the respective wires of the conductive wire bundle in accordance with a day of the week as determined by the current state of the clock, and thereby illuminate one of the plurality of sections in each of the transition objects.

6 Claims, 10 Drawing Sheets

(56) References Cited

U.S. PATENT DOCUMENTS

| | | | | |
|---|---|---|---|---|
| 2002/0142275 A1* | 10/2002 | Wexler | .................. | A44C 23/00 |
| | | | | 434/246 |
| 2003/0086521 A1 | 5/2003 | Rana | | |
| 2005/0026120 A1* | 2/2005 | Delvecchio | ............ | G09B 19/00 |
| | | | | 434/236 |
| 2006/0177806 A1 | 8/2006 | Parsons | | |
| 2007/0292827 A1* | 12/2007 | Forbath | .................. | G06M 1/00 |
| | | | | 434/246 |
| 2008/0070211 A1 | 3/2008 | DeToma et al. | | |

* cited by examiner

ROSARY HAVING ILLUMINATED OBJECTS AND A CLOCK FOR IDENTIFYING PRAYERS OF THE DAY

CROSS-REFERENCE TO RELATED APPLICATIONS

This application claims priority to copending U.S. Provisional Patent Application No. 63/133,289 filed Jan. 1, 2021, which is incorporated by reference herein.

BACKGROUND OF THE INVENTION

The rosary is a staple in the typical Catholic household. Starting from a young age, Catholics are taught to pray the rosary and recite the mysteries associated with each week of the day. There are four groups of five mysteries which are usually memorized. Memorizing all the mysteries and what category to recite for the day may not be difficult for people who are middle aged, but the elderly community and children would have trouble remembering them.

There are four categories of mysteries: Joyful, Sorrowful, Glorious, and Luminous. Each of these categories are assigned to a different day of the week and have five mysteries within them, one mystery for every decade of the rosary. This can easily become confusing and difficult to memorize for older people and kids. Also, elder people may even have trouble knowing what day of the week it is. Currently, people use a rosary book to assist them in prayer. This can become a nuisance, as having to look back and forth between the pages can be a distraction during prayer. Accordingly, there is a need for rosary beads that assist a person in praying the rosary. The present invention fulfills such a need.

As further background to the present invention, conventional rosary beads are characterized by an upper portion or loop portion, and a lower portion or pendulum-like portion. The upper portion, when laid out flat and separated out, has a generally circular or oval configuration. Rosary beads are used to keep count of the number of Hail Marys that are said as the mysteries are contemplated. The fingers are moved along the beads as the prayers are recited. A conventional five-decade rosary has five groups of ten beads (a decade), with additional large beads placed before each decade. These beads are all in the upper portion. The Hail Mary is repeated on the ten beads within a decade, and the Lord's Prayer is repeated on the large bead before each decade. A new mystery meditation starts at each of the large beads. Some rosaries contain other numbers of decades, such as fifteen decades which correspond to the traditional fifteen mysteries of the rosary. Both types of rosaries (i.e., five- and fifteen-decade rosaries) are attached to a shorter strand, which begins with a cross or crucifix, and typically followed by one large bead, three small beads, and one large bead, before connecting to the rest of the rosary. The shorter strand forms the lower portion of the rosary. Accordingly, a conventional five-decade rosary has 59 total beads (50 decade rosaries (five groups of ten), 5 large beads placed before each decade, and 4 beads above the crucifix).

Other configurations of conventional rosary beads are also known in the art. The beads above the crucifix (in the lower portion) may be the same size and may number more or less than four. Also, a medallion may be affixed at the topmost end of the lower portion. The medallion may serve as a three-end intersecting/connection element to join respective ends of the five groups of beads in the upper portion, and to join the lower portion to the upper portion.

SUMMARY OF THE PRESENT INVENTION

One solution to the problems discussed above regarding rosaries is to produce rosaries that have one mystery from each of the four categories (in chronological order) on every "Our Father" bead, and a watch-like device at the very beginning that is set to the current day of the week. ("Rosary," "rosaries," "rosary beads" and "Mystery Bead Rosary" are interchangeably referred to herein.) One of the four facets on each of the five "Our Father" beads light up to display the corresponding mystery. For example, if it is Friday, all of the "Our Father" beads will display the Sorrowful mysteries. The first "Our Father" bead will have the Agony in the Garden, the second will have the Scourging at the Pillar, and so on. Accordingly, the "Our Father" beads have four facets and LED lights that alternate as the day is changed on the watch. This can be very helpful to those who have dementia/Alzheimer's, and also for children who have trouble remembering what day of the week it is.

FIG. 1 is a drawing of a Mystery Bead Rosary in accordance with one preferred embodiment of the present invention. FIG. 1 illustrates a typical rosary design with at least the following differences compared to conventional rosaries:

i. The five "Our Father" beads may be lit using one of four facets, each facet having an image of a respective mystery. That is, each of the "Our Father" beads have a form factor of a multi-faceted display element.

ii. A unitary structure that includes digital clock (10), logic circuit (9) and battery (11) takes the place of the medallion. The unitary structure may alternatively have an overall ornamental appearance of a medallion, but with the addition of digital clock, logic circuit, and battery elements integrated therein.

There is a button on the digital clock (10) to set the day and time (3) for the clock and another button to start/stop (2) the prayer session. Double clicking the start/stop (2) button allows the user to change the mystery that they are praying during the prayer session (it will reset to the mystery corresponding to the clock once it is turned off and on again). A cable (5) runs throughout the rosary which is meant to connect the Our Father beads so that the respective mystery for the day will be lit. Each individual Our Father bead (4) is divided into four quadrants which each contain an LED bulb (7). A dividing wall (6) separates each quadrant so that only one quadrant will be lit when one LED (7) is turned on. This will illuminate a transparent colored plastic (8) of the bead so the mystery and image of the mystery will be visible to the user on the bead.

The mysteries of the rosary can be challenging to remember since there are different ones for each day of the week. Many Catholics pray the rosary on a regular basis and having a device that tells them what mysteries to pray for the day is very beneficial. The rosary described herein provides such a device which can tell what day of the week it is and what mysteries are associated with that day, and can communicate this information to the user.

Referring to the prior art, various rosaries have been proposed which assist the user in the prayer process. However, none of these prior art rosaries have the combination of inventive features described herein.

U.S. Pat. No. 7,204,694 (Delvecchio et al.) discloses a rosary that includes a flexible elongate member and a plurality of beads carried thereby. The plurality of beads comprise sets of beads separated by respective transition beads (decade beads). The rosary may also include a sensor, and an audible indicator carried by the flexible elongate member for providing an audible indication based upon the sensor. The rosary may further include a visual indicator, in addition to or in place of, the audible indicator. The visual indicator may also be carried by the flexible elongate member for providing a visual indication based upon the sensor. The visual indicator also includes a timer for providing a different visual indication based upon a calendar date. Each of the transition beads may be illuminated via a visual display to provide an illuminated image on the respective transition bead. The user may activate the visual indication by contacting a switch carried on the transition bead. Thus, to view the illuminated images on the respective transition beads, five different switches must be manually activated by the user. However, unlike the Our Father beads (transition objects) of the present invention, the visual displays in the transition beads of Delvecchio et al. do not include a plurality of sections which are individually illuminated by a respective light source to reveal or visually highlight an image in the respective section based on input signals from a clock. Also, to view the illuminated images on the respective transition beads in Delvecchio, five different switches must be manually activated by the user, whereas no user input is required to made with respect to any of the Our Father beads (transition objects) of the present invention to have the appropriate section illuminated, since the illumination occurs automatically when the device is turned on. Furthermore, the visual indicator in Delvecchio et al. is not attached to any of the transition beads, whereas the displays in the present invention are fixedly attached to respective Our Father beads (transition objects).

U.S. Patent Application Publication No. 2008/0070211 (DeToma et al.) discloses an illuminated Rosary with audio assistance to assist a user in utilizing the prayer facilitator in the correct sequence and prayers for praying the Rosary. The Rosary includes a controller that is configured with an integrated circuit board and memory that has stored therein a plurality of audio files containing the words to prayers required to complete the prayer of the Rosary. The controller further includes a switch and conventional audio electronics for subsequent retrieval and playing of the audio files. The Rosary further includes a plurality of prayer beads and a control wire that operably connects the prayer beads to the controller. The prayer beads include at least one sensor configured to detect pressure thereon by a user. Referring to FIG. 2 of DeToma et al., each prayer bead may be illuminated via a light encased therein. The Rosary in DeToma et al. also includes decade beads. The controller assists a user in praying the Rosary by illuminating the beads in the required sequence and by playing a recording of the prayer corresponding with the illuminated bead. However, unlike the Our Father beads (transition objects) of the present invention, the beads of DeToma et al. do not include a plurality of sections which are individually illuminated by a respective light source to reveal or visually highlight an image in the respective section based on input signals from a clock.

U.S. Patent Application Publication No. 2006/0177806 (Parsons) discloses an apparatus for praying the rosary. The apparatus includes a crucifix-shaped housing that includes electronics operable to sequentially illuminate at least one of a plurality of luminescent beads. The electronics include a sequence timer housed within the crucifix-shaped housing and operable to periodically provide an electronic signal to sequentially illuminate each luminescent bead of the plurality of luminescent beads. A conductor is provided and includes a first end, a second end, and a length between wherein the first end is coupled to a first terminal of the crucifix shaped housing and the second end is coupled to a second terminal of the crucifix shaped housing. The conductor is electrically coupled to the sequence timer to conduct the electronic signal. The apparatus further includes a medallion positioned along the conductor and operable to separate the conductor into an upper portion including a loop portion and lower portion including a pendulum portion. A first series of five luminescent beads are electrically coupled to the conductor and positioned along the pendulum portion. Each of the five luminescent beads is operable to be sequentially illuminated in response to the electronic signal. A second series of fifty-four luminescent beads are electrically coupled to the conductor and positioned along the loop portion. Each of the fifty-four luminescent beads are operable to be sequentially illuminated in response to the electronic signal. In Parsons, selected beads emit different color lights which indicate to the user to pray or recite a different prayer when illuminated. However, unlike the Our Father beads (transition objects) of the present invention, the beads of Parsons do not include a plurality of sections which are individually illuminated by a respective light source to reveal or visually highlight an image in the respective section based on input signals from a clock.

U.S. Patent Application Publication No. 2003/0086521 (Rana) discloses an electronic handheld rosary apparatus with beads. However, unlike the Our Father beads (transition objects) of the present invention, the beads of Rana do not include a plurality of sections which are individually illuminated by a respective light source to reveal or visually highlight an image in the respective section based on input signals from a clock.

U.S. Pat. No. 4,601,584 (DeWolf et al.), U.S. Pat. No. 5,505,622 (Bosmani), and U.S. Pat. No. 6,540,519 (Wexler), and Electronic Rosary (digital voice talking e-Rosary) disclose electronic devices to assist in recitation of the rosary. However, none of these devices include physical beads.

BRIEF DESCRIPTION OF THE DRAWINGS

Embodiments of the present invention will now be described by way of example with reference to the accompanying drawings.

DETAILED DESCRIPTION OF THE INVENTION

Figure 1:
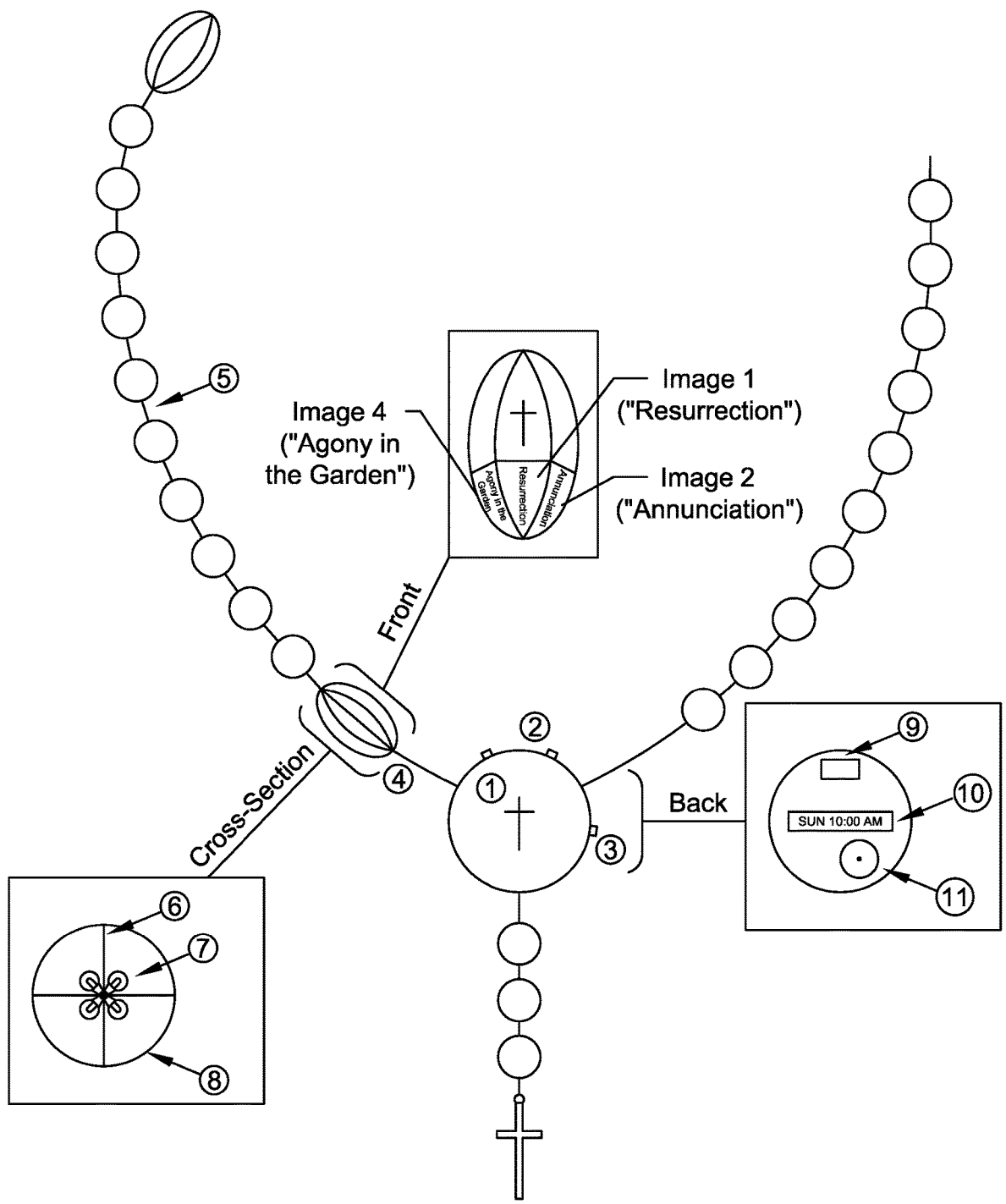
FIG. 1 is a drawing of a portion of a Mystery Bead Rosary in accordance with one preferred embodiment of the present invention.

Certain terminology is used herein for convenience only and is not to be taken as a limitation on the present invention.

The words "a" and "an", as used in the claims and in the corresponding portions of the specification, mean "at least one."

Referring again to FIG. 1, the rosary beads of FIG. 1 include the following components:
1. medal (medallion) having a clock integrated therein
2. push button (start/on)
3. clock set button
4. Our Father bead with facets
5. cable/wire
6. dividing wall between adjacent facets
7. bulbs (e.g., white LED bulbs)
8. transparent colored plastic outer shell
9. logic circuit (inside of the medal
10. digital clock display (day/hour)
11. battery As discussed above, there are four groups of five mysteries constituting 20 different prayers. Since there are four facets per "Our Father" bead, and five "Our Father beads, there are 20 different facets to be used for the 20 different prayers, respectively.

The cable/wire 5 is a thin bundle of five wires (also referred to collectively as "conductive wire bundle"), four which supply power and one ground wire. Only one of the power supply wires are activated at a time, thereby ensuring that only one facet of each "Our Father" bead is illuminated at a time. As explained above, the clock is used to determine which power supply wire to activate. The conductive wire bundle also functions as the flexible thread material that would normally be used to thread the rosary beads. Since there are no electrical components in the lower portion, conventional thread material may be used for this portion.

Figure 2:
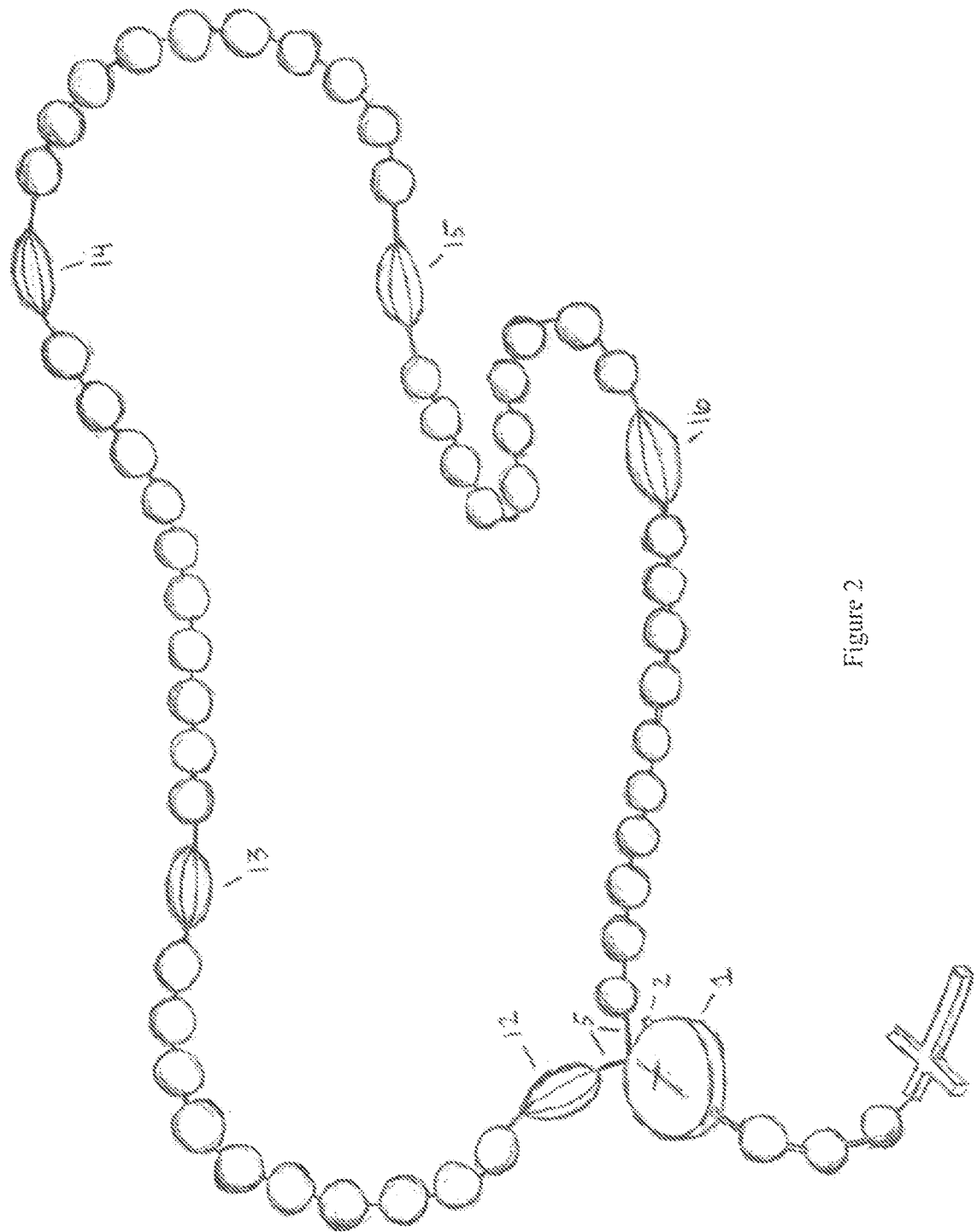
FIG. 2 is a drawing of the entire portion of the Mystery Bead Rosary of FIG. 1.

FIG. 2 is a view of all of the rosary beads, including all five of the "Our Father" beads. (FIG. 1 is only a partial view, and shows only two of the five beads.) The five beads are labeled as 12-16.

FIGS. 3A-3E are enlarged front views of each of the five "Our Father" beads. The beads 12-16 are shown in a clockwise manner, with the bead 12 of FIG. 3A being the bead closest to the clock on the leftmost side, and the bead 16 of FIG. 3E being the bead closest to the clock on the rightmost side.

The facets of the "Our Father" beads are illuminated in accordance with the following schedule shown in Table 1 (numbers refer to the corresponding numbers in the figures:

TABLE 1

Figure 3A:
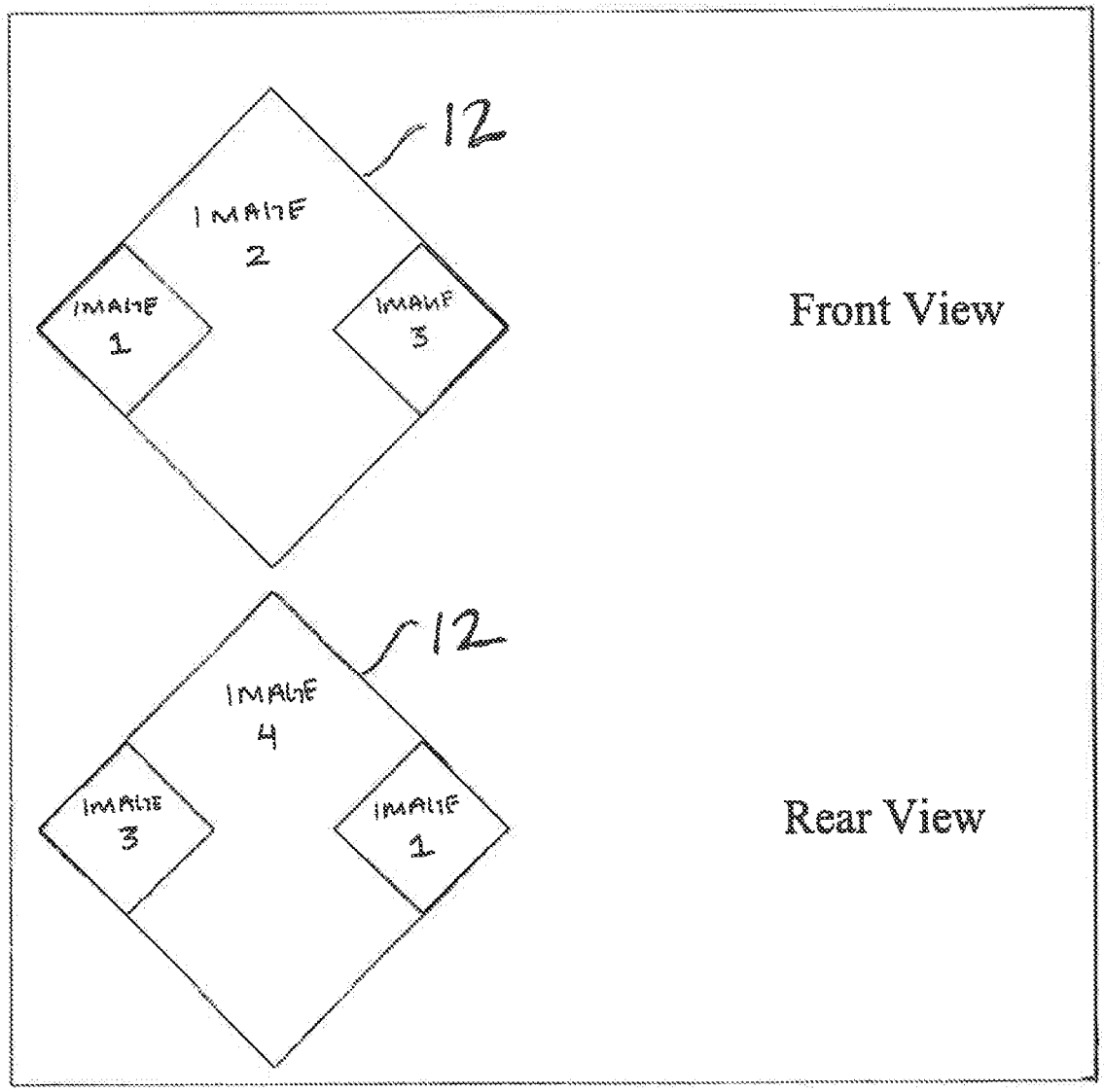
FIGS. 3A-3E are enlarged views of the individual "Our Father" beads of the Mystery Bead Rosary of FIGS. 1 and 2.
Figure 3B:
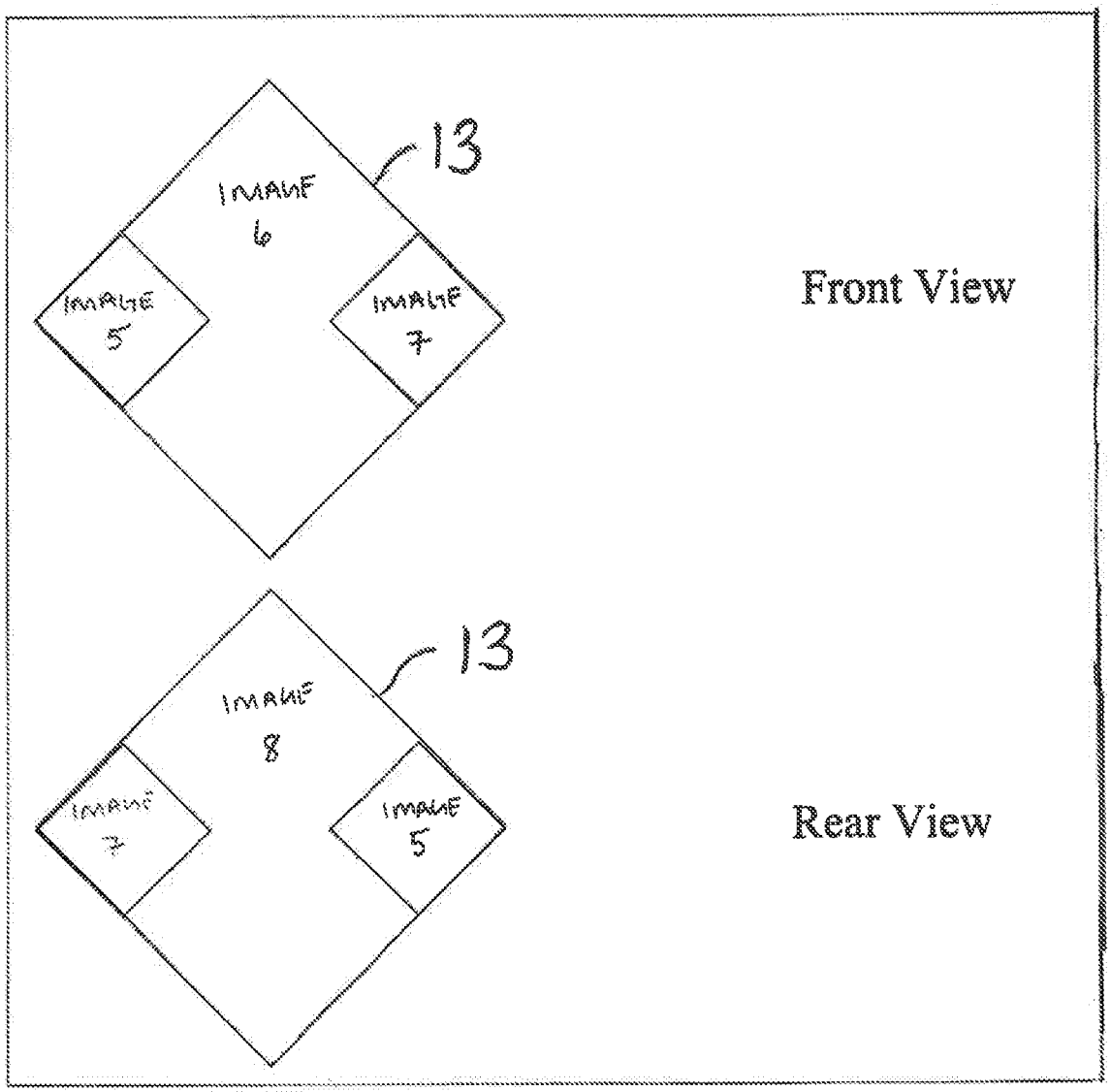
Figure 3C:
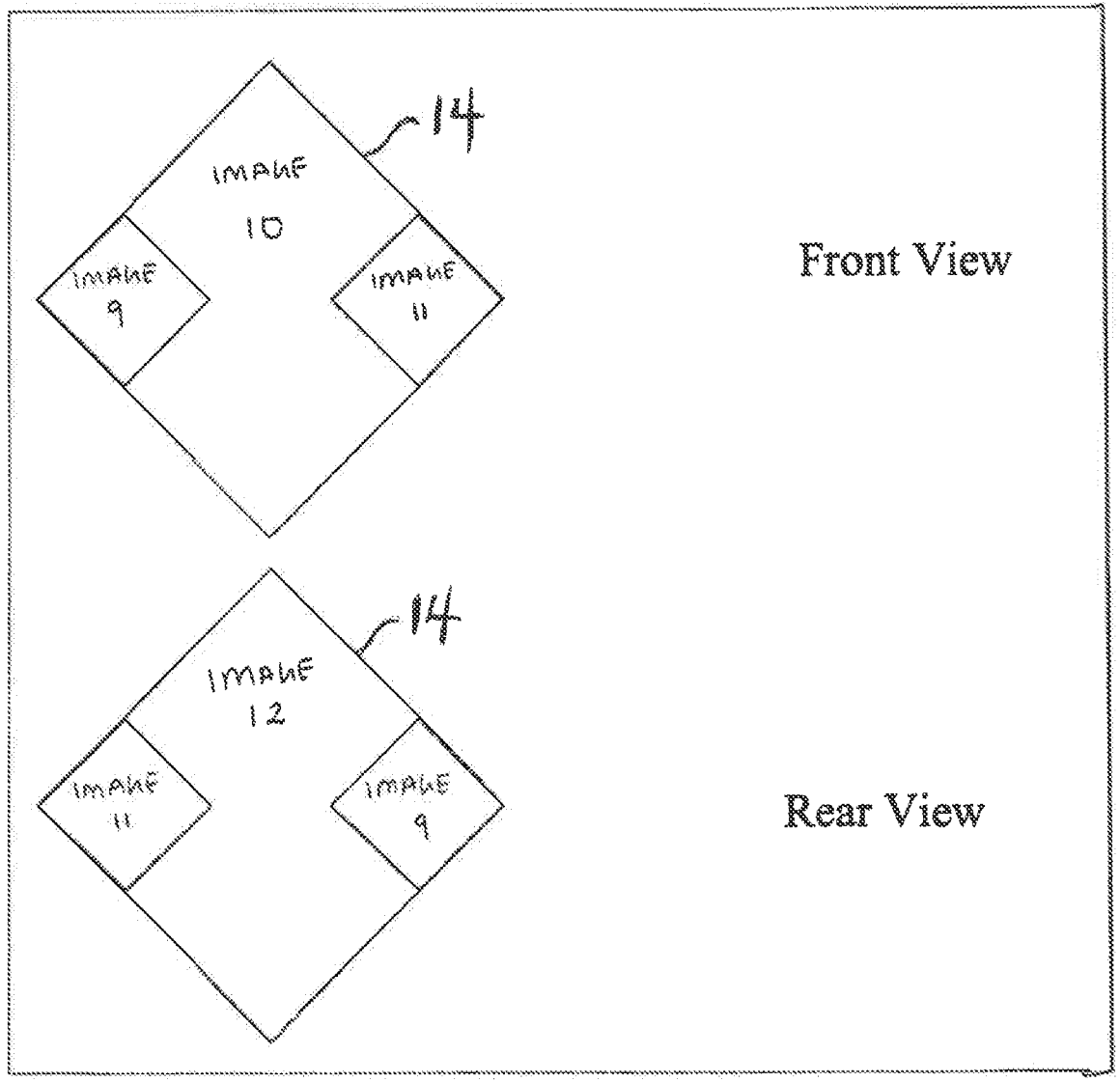
Figure 3D:
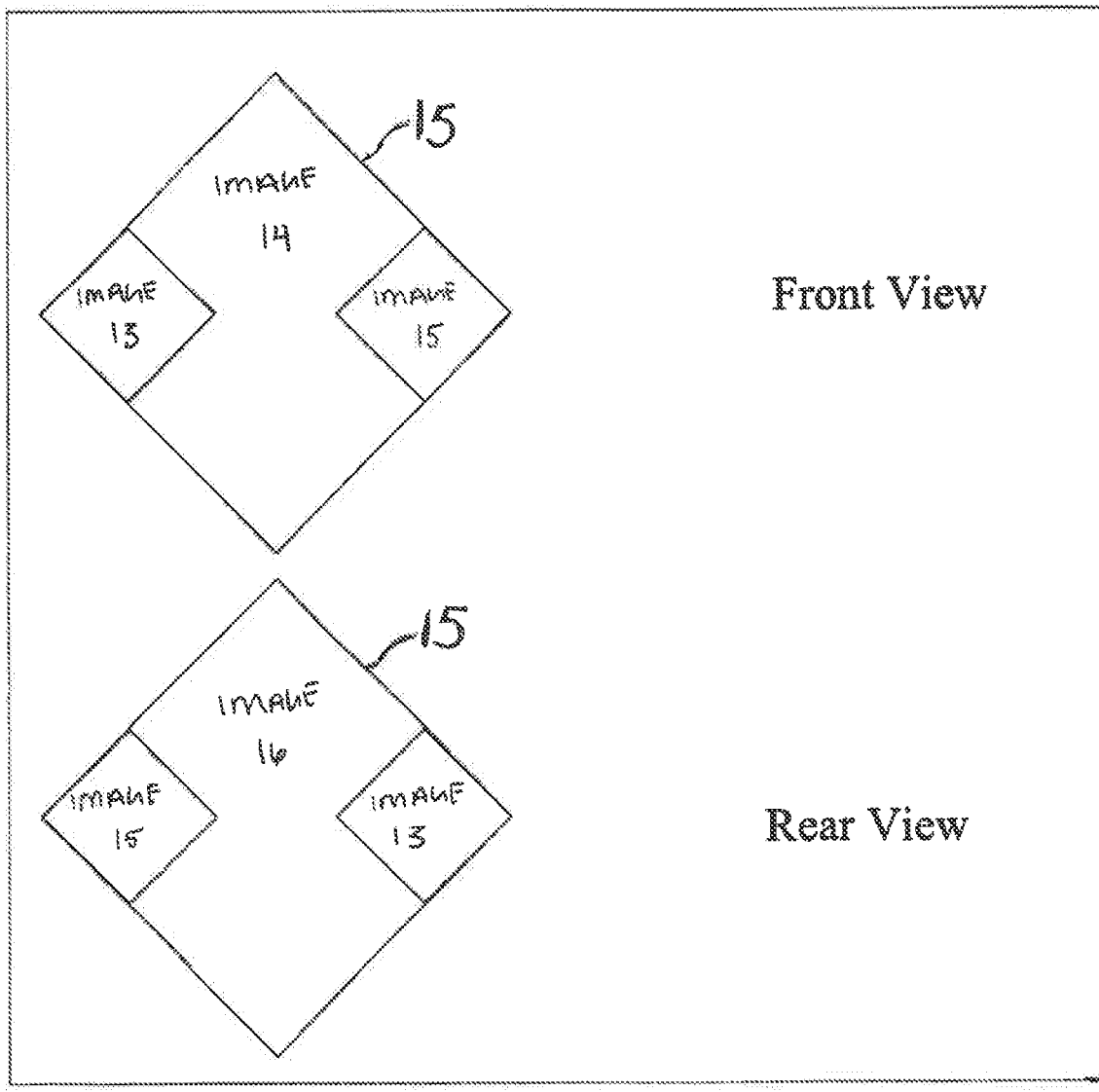
Figure 3E:
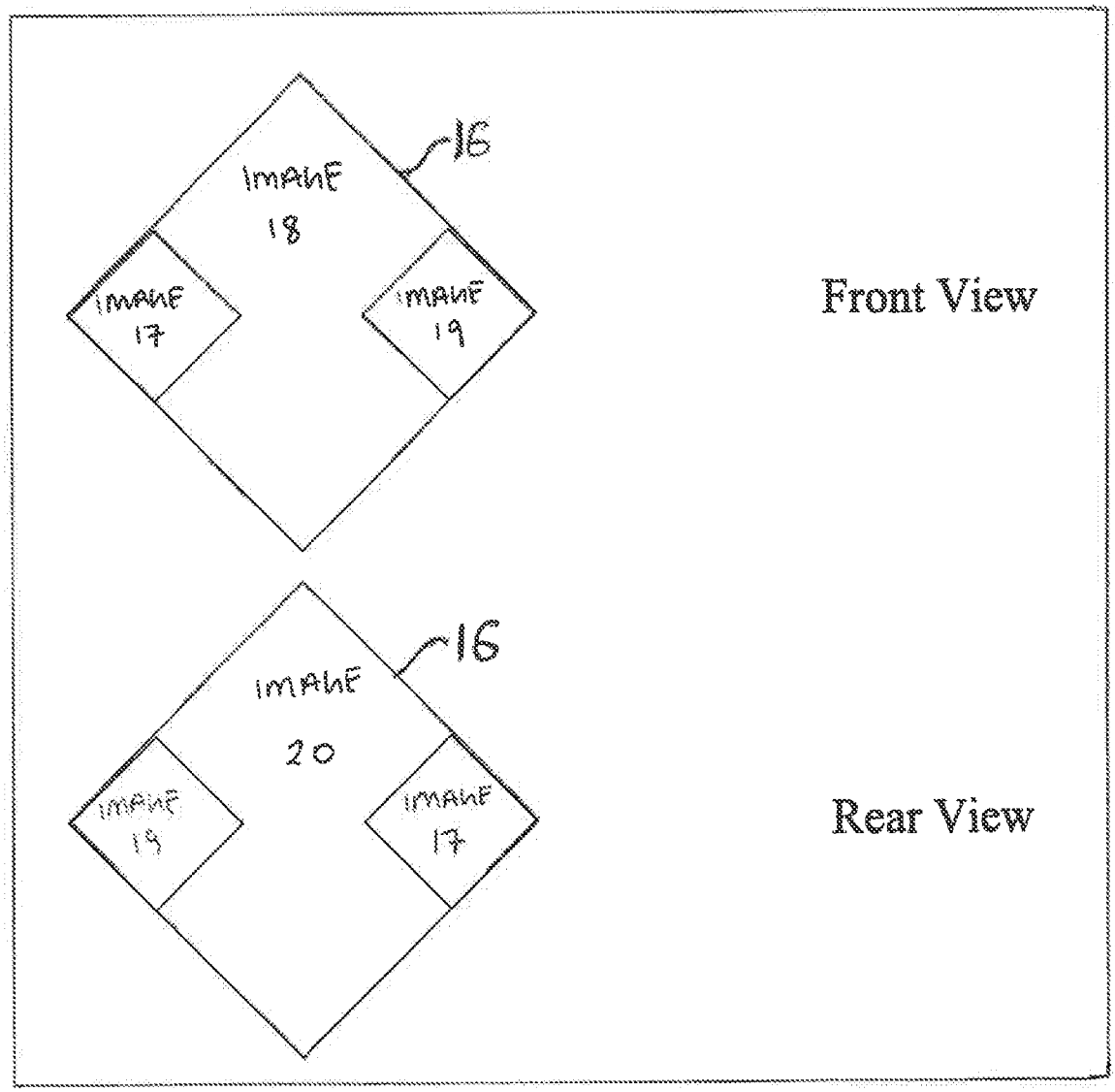
Figure 4A:
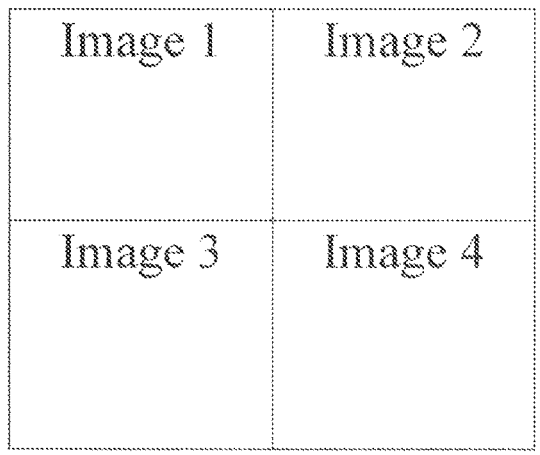
FIGS. 4A-4E are enlarged views of the individual "Our Father" beads of the Mystery Bead Rosary of FIG. 1 with a flat display.
Figure 4B:
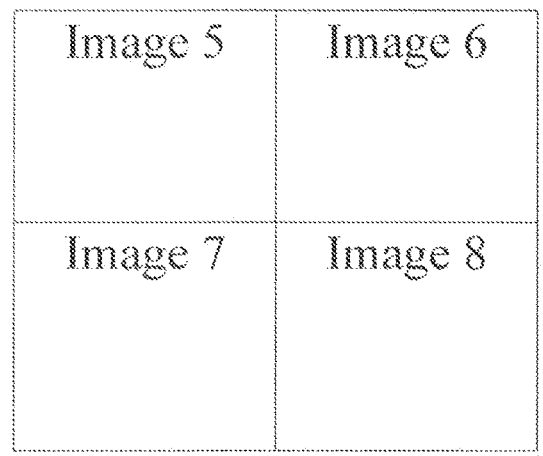
Figure 4C:
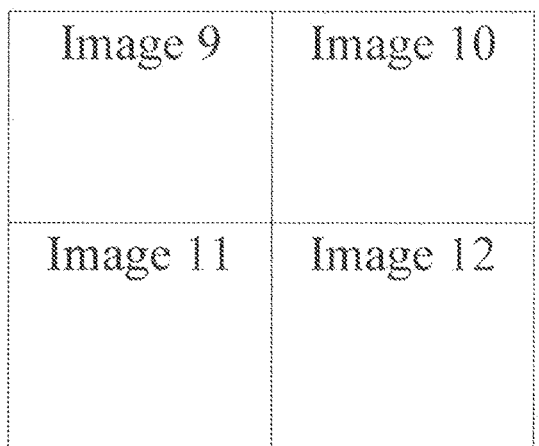
Figure 4D:
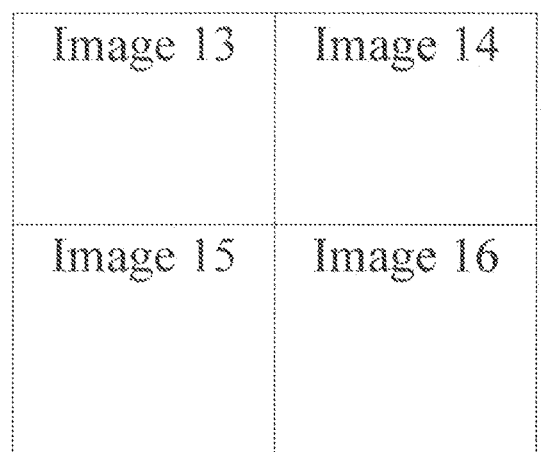
Figure 4E:
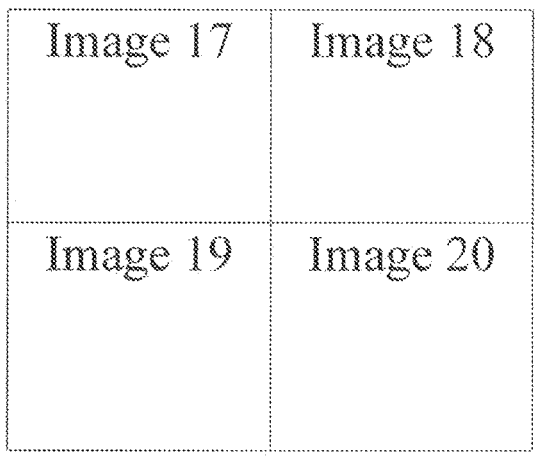

| Day of the week | FIG. 3A | FIG. 3B | FIG. 3C | FIG. 3D | FIG. 3E |
| --- | --- | --- | --- | --- | --- |
| Monday | Image 2 | Image 6 | Image 10 | Image 14 | Image 18 |
| Tuesday | Image 4 | Image 8 | Image 12 | Image 16 | Image 20 |
| Wednesday | Image 1 | Image 5 | Image 9 | Image 13 | Image 17 |
| Thursday | Image 3 | Image 7 | Image 11 | Image 15 | Image 19 |
| Friday | Image 4 | Image 8 | Image 12 | Image 16 | Image 20 |
| Saturday | Image 2 | Image 6 | Image 10 | Image 14 | Image 18 |
| Sunday | Image 1 | Image 5 | Image 9 | Image 13 | Image 17 |

The images 1-20 are as follows:
Image 1: Resurrection of the Lord.
Image 2: Annunciation of the birth of Jesus.
Image 3: Baptism of the Lord.
Image 4: Agony in the garden of gethsemane.
Image 5: Ascension of the Lord.
Image 6: Visitation.
Image 7: Wedding feast of Cana.
Image 8: Scourging at the pillar.
Image 9: The Pentecost.
Image 10: The Nativity of the Lord.
Image 11: Proclamation of the Kingdom.
Image 12: Crowning with thorns.
Image 13: Assumption of Blessed Mother.
Image 14: Presentation of Jesus in the temple.
Image 15: Transfiguration of the Lord.
Image 16: Jesus carrying the Cross.
Image 17: Coronation of Blessed Mother.
Image 18: Finding Jesus in the temple.
Image 19: Institution of the holy Eucharist.
Image 20: Crucifixion of the Lord.

In alternative embodiments of the present invention, the "Our Father" beads may have a different form factor than a three-dimensional bead, but will be physically located in the same locations as shown in FIGS. 1 and 2 so that the user is aware that they symbolize the "Our Father" beads of a rosary. For example, as shown in FIGS. 4A-4E, there may be five individual flat displays, each display having four quadrants which can be selectively lit up, one for each prayer. Thus, FIGS. 3A-3E correlate with FIGS. 4A-4E with respect to the images that appear on each of the respective objects. The flat display may be encased within a two-dimensional object having a bead-like ornamental appearance, or the flat display may simply be encased within a two or three-dimensional object that does not have a bead-like ornamental appearance. In these alternative embodiments, the conductive wire bundle would still extend through flat display or the object that the flat display is encased therein, so as to serve the same function as the conductive wire bundle shown in FIGS. 1 and 2.

Figure 5:
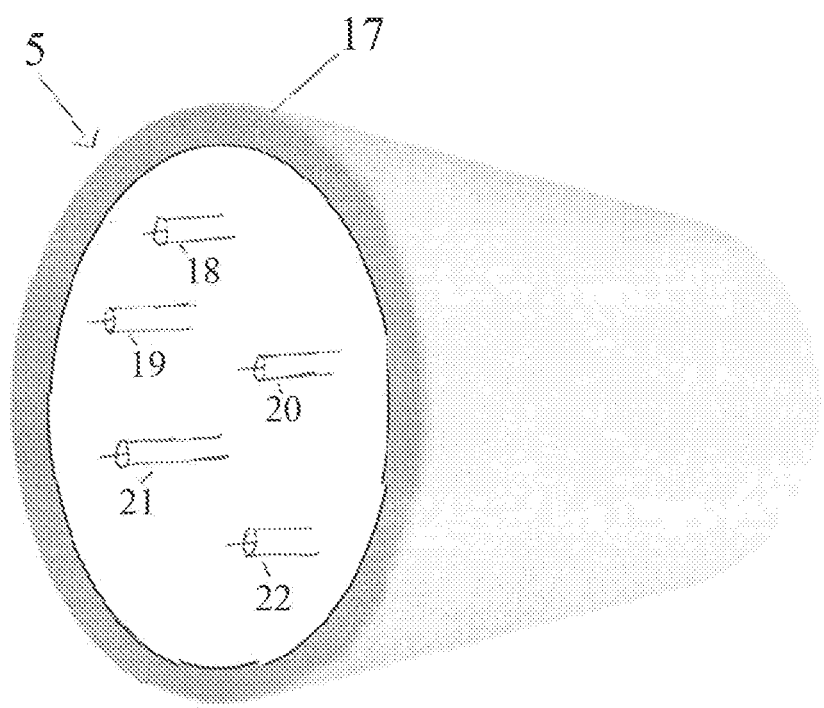
FIG. 5 is a cross-section of a cable/wire for a portion of the Mystery Bead Rosary of FIG. 1.

FIG. 5 illustrates details of the cable/wire 5. Outer sheath 17 encases five internal wires 18-22. In one preferred embodiment, the wires 18-22 are as follows:

Wire 18: wire to connect and energize all yellow-colored LEDs

Wire 19: wire to connect and energize all green-colored LEDs

Wire 20: wire to connect and energize all white-colored LEDs

Wire 21: wire to connect and energize all red-colored LEDs

Wire 22: ground connection for all LEDs

In this embodiment, different color LEDs are used in each of the beads. However, in another embodiment, all of the LEDs may be white, or the same color.

One advantage of using color LEDs instead of white LEDs is that if the rosary is being used under very bright light (e.g., daylight), it will be easier to identify the LED that is "on" when the LEDs are colored, especially if the images are on a white surface. Also, some sets of mysteries have a season associated with it within the Church, so the color can be selected to match the season. For example, the joyful mystery is associated with the birth of Christ. The vestments used in the church will be a green color during Christmas season. Similarly, a red color is appropriate for Easter. In an alternative embodiment, white LEDs are used and each facet is given a suitable color. Manufacturing and assembly issues will determine the best approach regarding the use of color.

Figure 6:
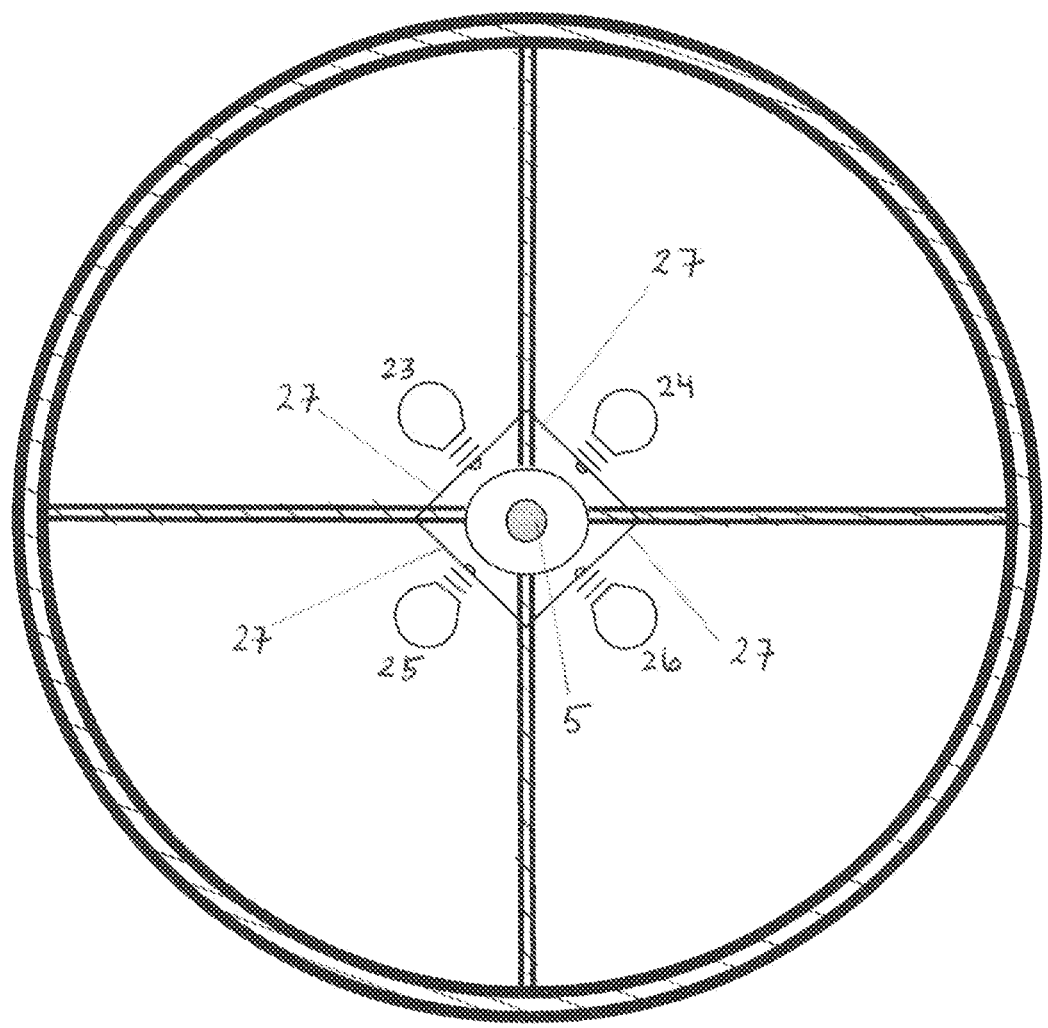
FIG. 6 is a cross-section of an individual "Our Father" bead showing internally mounted components.

FIG. 6 shows a cross-section of one of the beads, and illustrates the components in more detail, as follows:
23: LED1—yellow
24: LED2—green
25: LED3—white
26: LED4—red
27: non-conductive surface to hold LEDs
5: wire/cable More generally, the embodiments described above may be characterized as a rosary (i.e., the entire object) having at least the following components with the corresponding elements described above noted in parentheses:

1. A flexible elongate member arranged in a loop (conductive wire bundle of the upper portion), and also including a leg portion (flexible thread material of the lower portion).

2. Plurality of beads carried on the flexible elongate member and the leg portion. These beads include sets of beads (five groups of ten beads—50 decade rosaries) separated by five transition beads (the five "Our Father beads with facets) that are carried upper portion, and the plurality of beads of the leg portion (beads of the lower portion). More generally, the transition beads may each be referred to as "transition objects."

3. A display fixedly attached to each of the transition objects. As discussed above, the display has a plurality of sections which may be individually illuminated to reveal or visually highlight an image in the respective section (the images are the images of the respective prayers). In the preferred embodiment, there are four sections. Each section of the display is individually illuminated via power being applied to the respective section by one of the wires of the conductive wire bundle. Thus, when power is sent to one of the wires of the conductive wire bundle, one section of each of the displays is illuminated.

4. A unitary structure that is connected to each end of the conductive wire bundle, and is also connected to the beads of the lower portion. The unitary structure, which may be formed of metal, or other rigid material, houses the clock, logic circuit and the battery. The logic circuit is controlled by the clock so as to send power to the appropriate one of the four wires of the conductive wire bundle depending upon the day of the week as indicated by the clock. The unitary structure is connected to each end of the conductive wire bundle, and is also connected to the beads of the lower portion. In this manner, the unitary structure and the beads of the upper portion form a loop with the conductive wire bundle extending therethrough so as to provide power to each of the transition objects.

There may also be a leg portion that includes an additional set of beads carried by the flexible thread material, and a religious object, wherein the unitary structure is further connected to one end of the leg portion and the religious object via the flexible thread material. The religious object is typically a cross or crucifix.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An apparatus for praying the rosary comprising:
   (a) a flexible elongate member and a plurality of beads and transition objects carried thereby, the plurality of beads including sets of beads separated by respective transition objects, wherein one portion of the flexible elongate member is a conductive wire bundle having a plurality of wires for providing power and ground for use by the transition objects;
   (b) a display fixedly attached to each of the transition objects, each display including a plurality of sections which are individually illuminated by a respective light source to reveal or visually highlight an image in the respective section, wherein the plurality of wires for providing power and ground are electrically connected to the display to provide power and ground to the respective light sources; and
   (c) a unitary structure that is connected to each end of the conductive wire bundle, the unitary structure housing a clock, a logic circuit, and a power source for the clock and logic circuit, wherein the logic circuit is electrically connected to the conductive wire bundle so as to output power to one of the respective wires of the conductive wire bundle in accordance with a day of the week as determined by the current state of the clock, and thereby illuminate one of the plurality of sections in each of the transition objects,
      wherein the logic circuit is configured to automatically illuminate one of the plurality of sections in each of the transition objects when power is applied to the logic circuit from the power source, without requiring any user input to be made with respect to any of the transition objects.

2. The apparatus of claim 1 wherein there are five transition objects and four sections in the plurality of sections which collectively provide a total of twenty different images to be revealed or visually highlighted as a result of the illuminating light sources, five of the sections being illuminated on each day of the week with one section per transition object.

3. The apparatus of claim 1 wherein the transition objects are Our Father beads having the display fixedly attached thereto.

4. The apparatus of claim 1 wherein the display is a multi-faceted display, each facet being one of the plurality of sections.

5. The apparatus of claim 1 wherein the display is a flat display having a plurality of sections.

6. The apparatus of claim 1 wherein the flexible elongate member includes another portion which is flexible thread material, the apparatus further comprising:
   (d) a leg portion that includes an additional set of beads carried by the flexible thread material, and a religious object, wherein the unitary structure is further connected to one end of the leg portion and the religious object via the flexible thread material.

* * * * *